(12) United States Patent
Kawamura

(10) Patent No.: US 7,284,022 B2
(45) Date of Patent: Oct. 16, 2007

(54) DATABASE MANAGEMENT METHODS AND EQUIPMENT AND DATABASE MANAGEMENT PROGRAM STORAGE MEDIA

(75) Inventor: Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 10/405,225

(22) Filed: Apr. 3, 2003

(65) Prior Publication Data
US 2005/0050050 A1 Mar. 3, 2005

Related U.S. Application Data

(63) Continuation of application No. 09/702,351, filed on Oct. 31, 2000, now Pat. No. 6,578,039.

(51) Int. Cl.
G06F 17/30 (2006.01)
(52) U.S. Cl. ............... 707/205; 707/2; 707/3; 707/10; 707/101
(58) Field of Classification Search .......... 707/2, 707/3, 10, 100, 205
See application file for complete search history.

(56) References Cited

U.S. PATENT DOCUMENTS

| 4,412,285 | A |  | 10/1983 | Neches et al. ........ 364/200 |
|---|---|---|---|---|
| 5,515,531 | A |  | 5/1996 | Fujiwara et al. ........ 707/3 |
| 5,634,125 | A |  | 5/1997 | Li ........ 707/203 |
| 5,687,369 | A |  | 11/1997 | Li ........ 707/203 |
| 5,742,806 | A | * | 4/1998 | Reiner et al. ........ 707/3 |
| 5,819,083 | A | * | 10/1998 | Chen et al. ........ 707/10 |
| 6,289,334 | B1 | * | 9/2001 | Reiner et al. ........ 707/3 |
| 6,578,039 | B1 | * | 6/2003 | Kawamura ........ 707/100 |
| 6,816,854 | B2 | * | 11/2004 | Reiner et al. ........ 707/3 |
| 7,080,101 | B1 | * | 7/2006 | Watson et al. ........ 707/201 |

FOREIGN PATENT DOCUMENTS

| JP | 06139119 | 5/1994 |
|---|---|---|
| JP | 61314299 | 11/1994 |
| JP | 07141394 | 6/1995 |
| JP | 09293006 | 11/1997 |

* cited by examiner

Primary Examiner—Jean M. Corrielus
(74) Attorney, Agent, or Firm—Mattingly, Stranger, Malur & Brundidge, P.C.

(57) ABSTRACT

Multiple key ranges are correlated with multiple data storage areas provided in memory. In storing data in a database, the data is stored in the data storage area correlated with the key range containing the data. When the addition of a data storage area as mentioned above is needed, a given volume of data is moved from the multiple data storages to the newly added data storage area and the key ranges for the moved data are correlated with the data storage areas.

10 Claims, 10 Drawing Sheets

DATABASE MANAGEMENT METHODS AND EQUIPMENT AND DATABASE MANAGEMENT PROGRAM STORAGE MEDIA

The present application is a continuation of application Ser. No. 09/702,351, filed Oct. 31, 2000, now U.S. Pat. No. 6,578,039 the contents of which are incorporated herein by reference.

BACKGROUND OF THE INVENTION

This invention relates to database management technology for storing data in a plurality of storage areas. Generally, in a database system having a database, data held in the database changes momentarily. When more and more new data is added to the database over time, the data volume may exceed the capacity of the storage area prepared for the database.

For this reason, in the conventional method for handling a large scale database, the database is divided into several partitions which are stored in separate storage areas. There are three methods for partitioning a database for storage into a plurality of database storage areas: key-range partitioning, hash partitioning and equi-partitioning. Depending on the partitioning method used, one partition may be correlated with one storage area, or two or more partitions may be correlated with one storage area. In case of new data being added over time, two ways of database expansion are available. When the key range partitioning method is used, a new key range can be added or a key range can be divided. This approach may not require addition of a new database storage area. The other approach is to add a new storage area or expand the existing database area without changing the partitioning. This approach increases the database storage area in response to the increase in data volume. In contrast, if the hash partitioning method is used, it is possible to flexibly handle data volume increases with reduced overhead.

However, though initially provided database storage areas can store newly added data, they may delete old data, which means that the data volume in the storage areas does not always increase. In this case, to make unused area to store new data, the database is reorganized so that old data is deleted.

On the other hand, for a database system which stores data cumulatively without deleting old data, since it takes resources management cost to prepare sufficient storage areas for expected data volume increases in the future, actually it is provided with database storage areas just enough to store the expected data volume in the near future only; if the data volume becomes too large to store, a new storage area is added.

Addition of a database storage area for a database necessitates redefinition of the database. The simplest way is to make a backup copy of the contents of the database and, after the database redefinition for the storage area addition, reload the backup database. For a large scale database, this procedure requires much time to make a backup copy of the database and needs considerable backup media cost and the process of reloading is very time consuming.

The first public known solution to this problem is the U.S. Pat. No. 4,412,285. This solution discloses a technique for pre-partitioning into buckets before partitioning a table by hashing, and correlating the buckets with virtual processors for their management.

As the second solution in the public domain, a technique which reorganizes, according to the frequency of access, the data in a key-range partitioned database on a parallel database system composed of a plurality of processors has been disclosed in the Japanese Patent Prepublication No. 139119/94.

As the third solution in the public domain, a technique which hierarchically partitions a database on a parallel database system composed of a plurality of processors has been disclosed in Japanese Patent Prepublication No. 314299/94.

Also, disclosures have been made on a technique which, for a partitioned database on a parallel database system composed of a plurality of processors (Japanese Patent Prepublication No.141394/95 as the fourth solution in the public domain) or for a database partitioned using a hash function (Japanese Patent Prepublication No. 293006/97 as the fifth solution in the public domain), allows data to be stored in a newly added storage area without the need for data rearrangement after the number of database partitions has been changed. In this case, however, though data rearrangement is unnecessary, all memories for partitions are checked at the time of data search.

SUMMARY OF THE INVENTION

In the above methods based on prior art, there is a problem concerning large scale databases. When the unused area in an initially given database storage area becomes insufficient due to addition of data to the table in the database, rearrangement of data is needed to increase the database scale.

In databases which use the abovementioned hash partitioning method, since the result of hashing is dependent on the number of partitions or the number of given database storage areas, if a new storage area is added, hashing of the data stored so far must be done again according to the updated number of partitions and stored again. This is a very time-consuming costly process, making it impossible to operate the database system efficiently.

If data is moved to another database storage area from each existing database storage area without restoring data as a result of re-hashing for rearrangement, loading of all data in each storage area must be done even if some data is to be left in the same storage area as a result of re-hashing. This makes it difficult to reduce data loading time and cost.

In databases which use key range partitioning, data rearrangement for a newly added storage area is not made taking the volume of data into consideration, though it is possible to add key ranges for maximum and minimum data or divide or merge existing key ranges.

The object of this invention is to provide a database management method or equipment that optimally stores data in a plurality of database storage areas.

To achieve the above object, the invention uses means to correlate a plurality of key ranges with a plurality of data storage areas in the memory so that when data is to be stored in the database, said data is stored in the data storage area correlated with the key range containing said data, and if an additional storage area is needed, a given volume of data from the plurality of data storages is moved to the above-said newly added storage area and the key ranges correlated with said moved data are correlated with said data storage areas.

BRIEF DESCRIPTION OF THE DRAWINGS

Other objects and advantages of the invention will become apparent during the following discussion of the accompanying drawings, wherein.

DESCRIPTION OF THE PREFERRED EMBODIMENTS

Next, one embodiment of this invention is explained in detail referring to the attached drawings.

An object of this embodiment is to provide a database management method which, if a new database storage area is added to a database partitioned by hashing, allocates data from existing database storage areas to the newly added database storage area with minimum cost.

Another object of this embodiment is to provide a database management method which, if a new database storage area is added to a key-range partitioned database, allocates data from existing database storage areas to the newly added database storage area with minimum cost and adds a new key range definition for the rearranged data.

Figure 2:
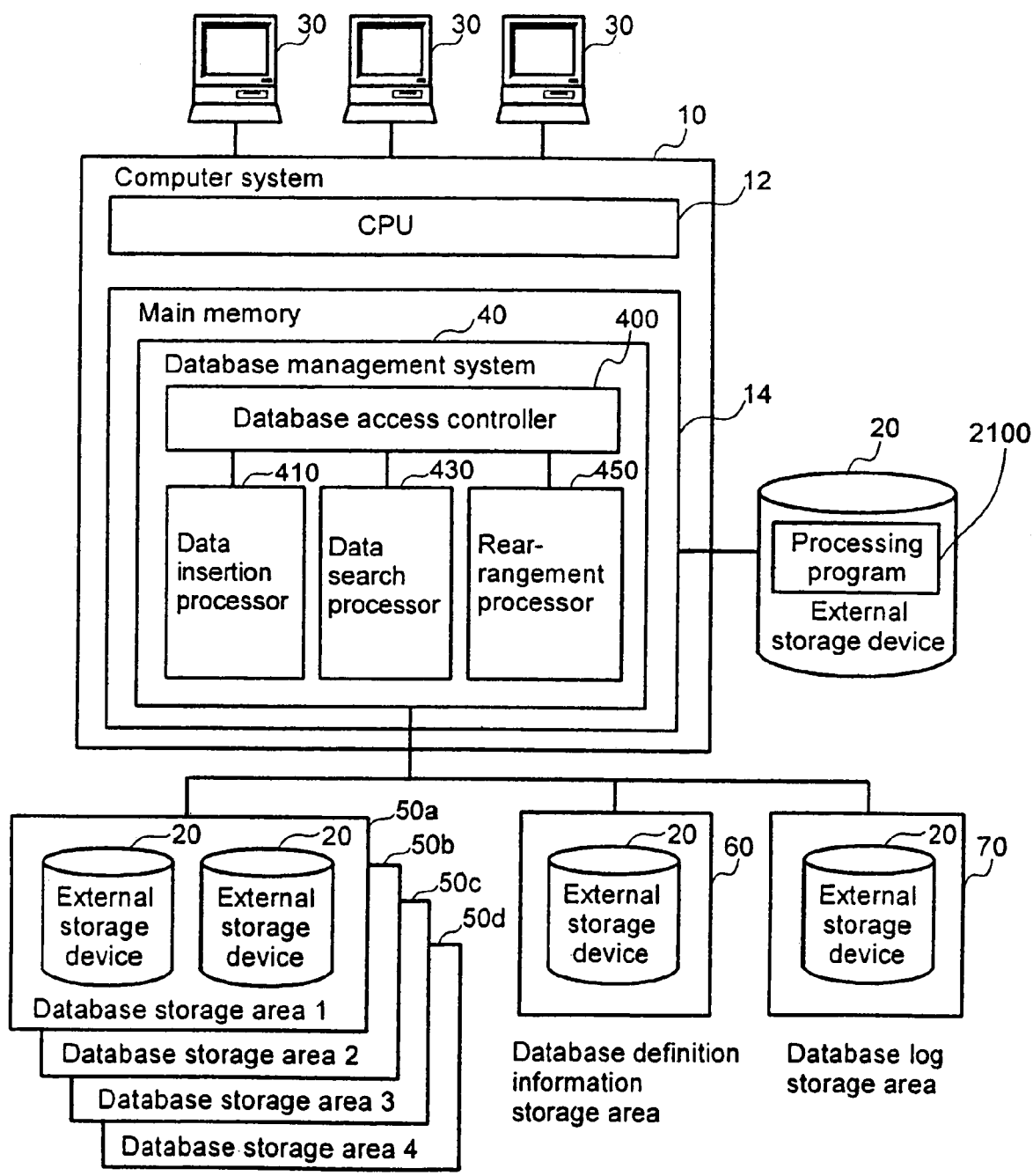
FIG. 2 shows the structure of a database management system to embody this invention.

FIG. 2 shows the structure of a computer system in this embodiment. The computer system 10 is composed of a CPU 12, a main memory 14, external storage devices 20 such as magnetic disc units and a number of terminals 30. On the main memory 14 is a database management system 40. This includes: database storage areas 50a, 50b, 50c and 50d which use a plurality of external storage devices 20 to store the database to be managed by the database management system 40; a database definition information storage area 60 which manages database definition information; and a database log storage area 70 which manages update history information related to database updating. In addition, a program 2100 that implements the database management system 40 is loaded in an external storage device 20. The database management system 40 consists of: a database access controller 400 which controls database access requests from terminals 30; a data insertion processor 410, a data search processor 430; and a rearrangement processor 450 which controls rearrangement of data in the database.

Figure 1:
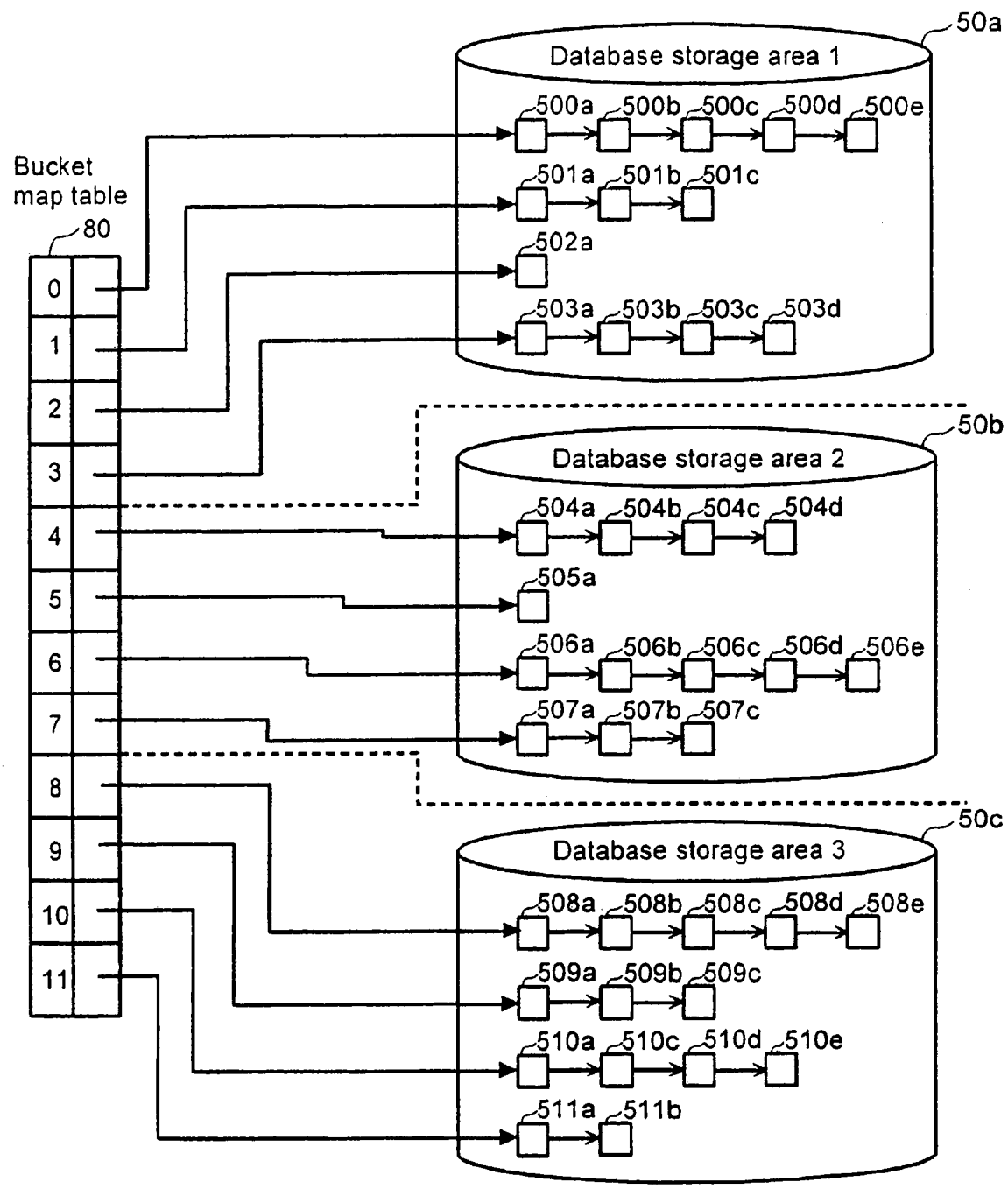
FIG. 1 shows the logic of database partitioning which characterizes this invention.

FIG. 1 shows the logic of management of a partitioned database according to this invention.

As an example, text for defining a "ZAIKO" table in the database is shown below.

```
CREATE  TABLE ZAIKO (
SCODE   CHAR(10),
SNAME   CHAR (10),
COL     CHAR (4),
TANKA   INTEGER,
ZSURYO  INTEGER)
HASH BY SCODE IN (DBAREA1, DBAREA2,
DBAREA3);
```

HASH BY SCODE IN (DBAREA1, DBAREA2, DBAREA3;

According to the above definition, the "ZAIKO" table is composed of four columns, SCODE, SNAME, COL, TANKA, and ZSURYO, each column being given a data type. With the SCODE column as a partitioning key, the data is partitioned by hashing and stored separately into three database storage areas DBAREA1, DBAREA2 and DBAREA3. Taking the "ZAIKO" table as an example, the logic of table partitioning is explained next referring to FIG. 1. In FIG. 1, for the data in the SCODE column as a partitioning key, a hash value is obtained using a hash function and the data is pre-divided into 12 buckets according to the bucket map table 80 based on the obtained hash value, and if three database storage areas are available, initialization is made so that four buckets are equally allocated to each database storage area. Also, with each entry in the bucket map table 80, pointer is stored for segments in the correlated database storage area. A segment is composed of a plurality of fixed-length pages. With bucket entry No. 0, the pointer for segment 500a is stored, suggesting that segments 500a, 500b, 500c, 500d and 500e are chained. With bucket entry No. 2, the pointer for segment 501a is stored, suggesting that segments 501a, 501b, and 501c are chained. From bucket entry No. 1, the pointer for segment 502a is stored. With bucket entry No.3, the pointer for segment 503a is stored, suggesting that segments 503a, 503b, 503c and 503d are chained. Likewise, the database storage area DBAREA2 stores buckets with bucket entry numbers 4 to 7, and the database storage area DBAREA3 stores buckets with bucket entry numbers 8 to 11.

Figure 3:
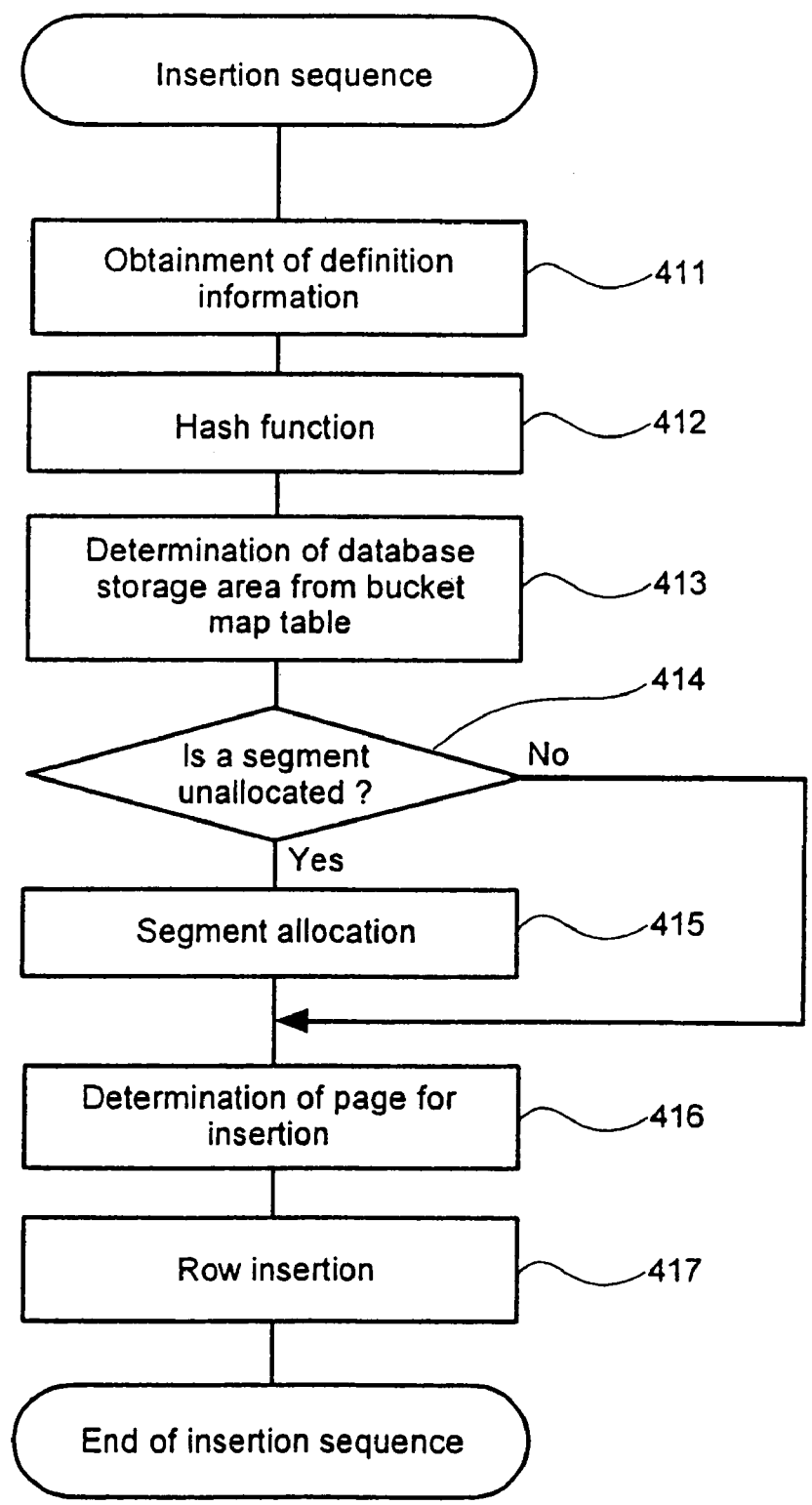
FIG. 3 shows a general flow of the sequence of data insertion into the table for this embodiment.

Taking the "ZAIKO" table as an example, a general flow of data insertion processing sequence is shown in FIG. 3. When a request for data insertion into the database table is made, a request as shown below is issued to the database management system in the case of the "ZAIKO" table.

INSERT INTO ZAIKO VALUES ('101', 'blouse, 'red', 35000, 62)

As the above insertion request is inputted from a terminal 30 as shown in FIG. 2, the database access controller 400 in the database management system 40 receives it. The database access controller 400 analyzes the received request and, when it recognizes the request as a data insertion request, it transfers the control over the request to the data insertion processor 410. In the data insertion processor 410, the definition information on the "ZAIKO" table is obtained from the database definition information storage area 60 (step 411). From the definition information on the "ZAIKO"table, it is found that the "ZAIKO" table is partitioned into four database storage areas with the "SCODE" column as a partitioning key. Hence, the hash function is applied to data value '101' corresponding to the "SCODE" column. This hash function is so designed as to minimize generation of synonyms and as a consequence the remainder from division by 12, the maximum number of buckets in this embodiment, becomes the hash value. Let's assume the hash value is 3 in this case. Then, the bucket map table is looked into in order to find in which database storage area the row concerned should be inserted and it is found that it is DBAREA 1(step 413). Furthermore, a check is made to see whether a segment is already allocated for the bucket entry No. 2(step 414) and if a segment is unallocated, a segment is newly allocated (step 415). In case of a segment being newly allocated, the pointer for the allocated segment is stored in said bucket entry in the bucket map table. If segment 502a is already allocated as shown in FIG. 1, whether a free page for insertion of said row is available in segment 502a is checked. If there is no such free page, a new segment is allocated and chained with segment 502a. If there is a free page, the page is specified as a page where the row is inserted (step 416). The row is inserted in the page thus specified (step 417). Upon row insertion, the updated log for said page is obtained in the database log storage area as shown in FIG. 2.

Figure 4:
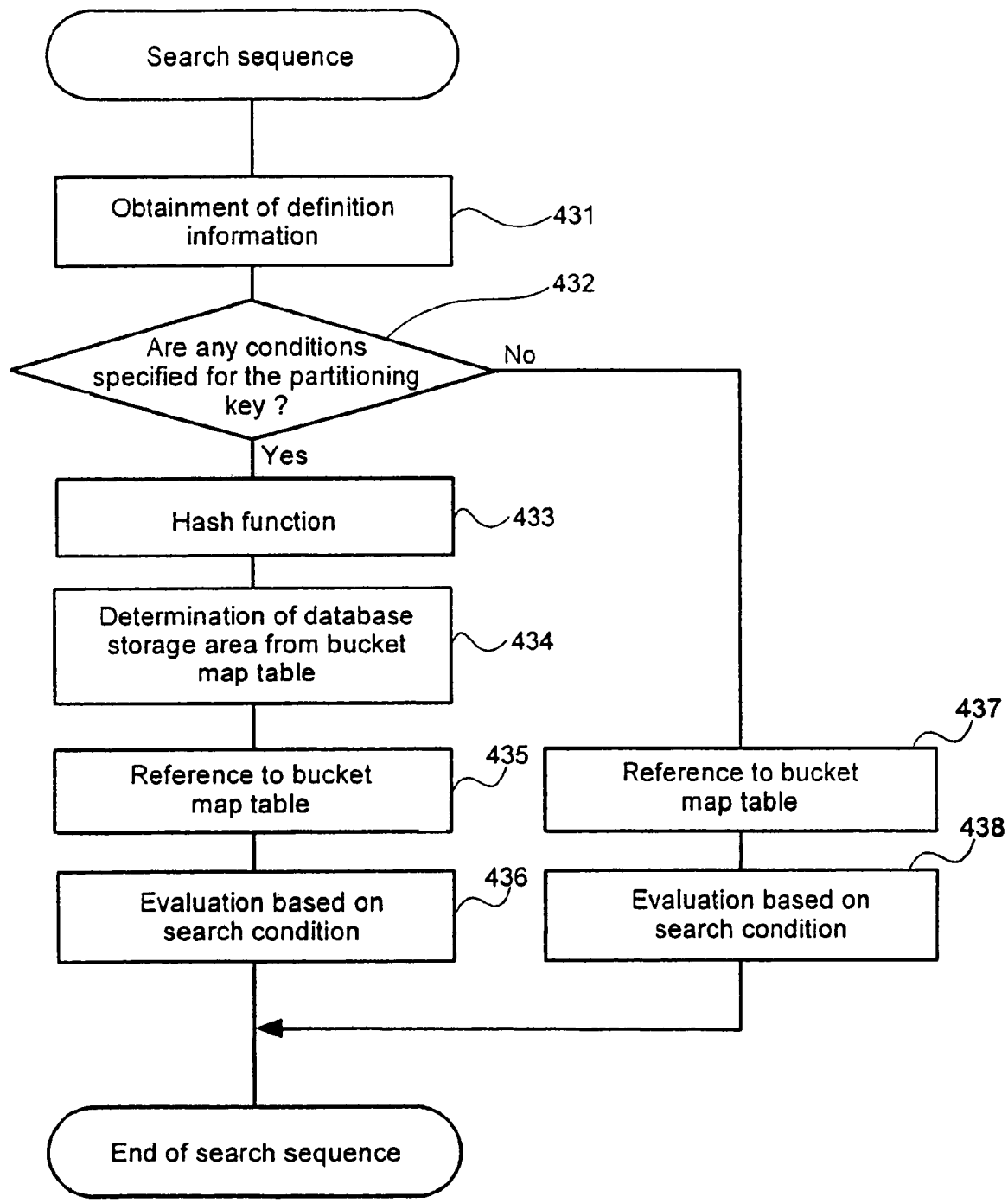
FIG. 4 shows a general flow of the sequence of search in the table for this embodiment.

Taking the "ZAIKO" table as an example, a general flow of data search processing sequence is shown in FIG. 4. When a request for data search is made to the database table, a request as shown below is issued to the database management system in the case of the "ZAIKO" table. SELECT SCODE, SNAME, COL, TANKA, ZSURYO FROM ZAIKO WHERE SNO='101'

As the above search request is inputted from a terminal 30 as shown in FIG. 2, the database access controller 400 in the database management system 40 receives it. The database access controller 400 analyzes the received request and, when it recognizes the request as a data search request, it transfers the control over the request to the data search processor 430, In the data search processor 430, the definition information on the "ZAIKO" table is obtained from the database definition information storage area 60 (step 431). From the obtained definition information, it is found that the "ZAIKO" table has been partitioned by hashing with the partitioning key "SCODE" column. Then, a check is made to see whether the search conditions for said search request include any specific conditions for the SCODE column as a partitioning key (step 432). In the case of said search request, since conditions for the SNO column are specified, the hash function is applied to determine the database storage area to be used (step 433). In this case, the hash function is applied to data value '101' corresponding to the "SCODE" column. This hash function is so designed as to minimize generation of synonyms and as a consequence the remainder from division by 12, the maximum number of buckets in this embodiment, becomes the hash value. Let's assume the hash value is 3 in this case. Then, the bucket map table is looked into in order to find in which database storage area the row concerned should be inserted and it is found that it is DBAREA1 (step 434). Once the database storage area to be used is determined, whether segments are already chained in the bucket within said database storage area is checked referring to the bucket map table (step 435). In case of segments being chained for said bucket, the data stored in all the chained segments is evaluated according to the search conditions (step 436). If there are no segments for said bucket, it means absence of data which matches the search conditions and thus the search result is zero match. On the other hand, in step 432, if no conditions are specified for the 810 column as a partitioning key, all database storage areas are searched. In case of all database storage areas being searched, for segments with non-zero segments numbers set in the bucket map table, within each database storage area, evaluation is made in accordance with the search conditions along the segment chain with each component number (steps 437 and 438).

Figure 5:
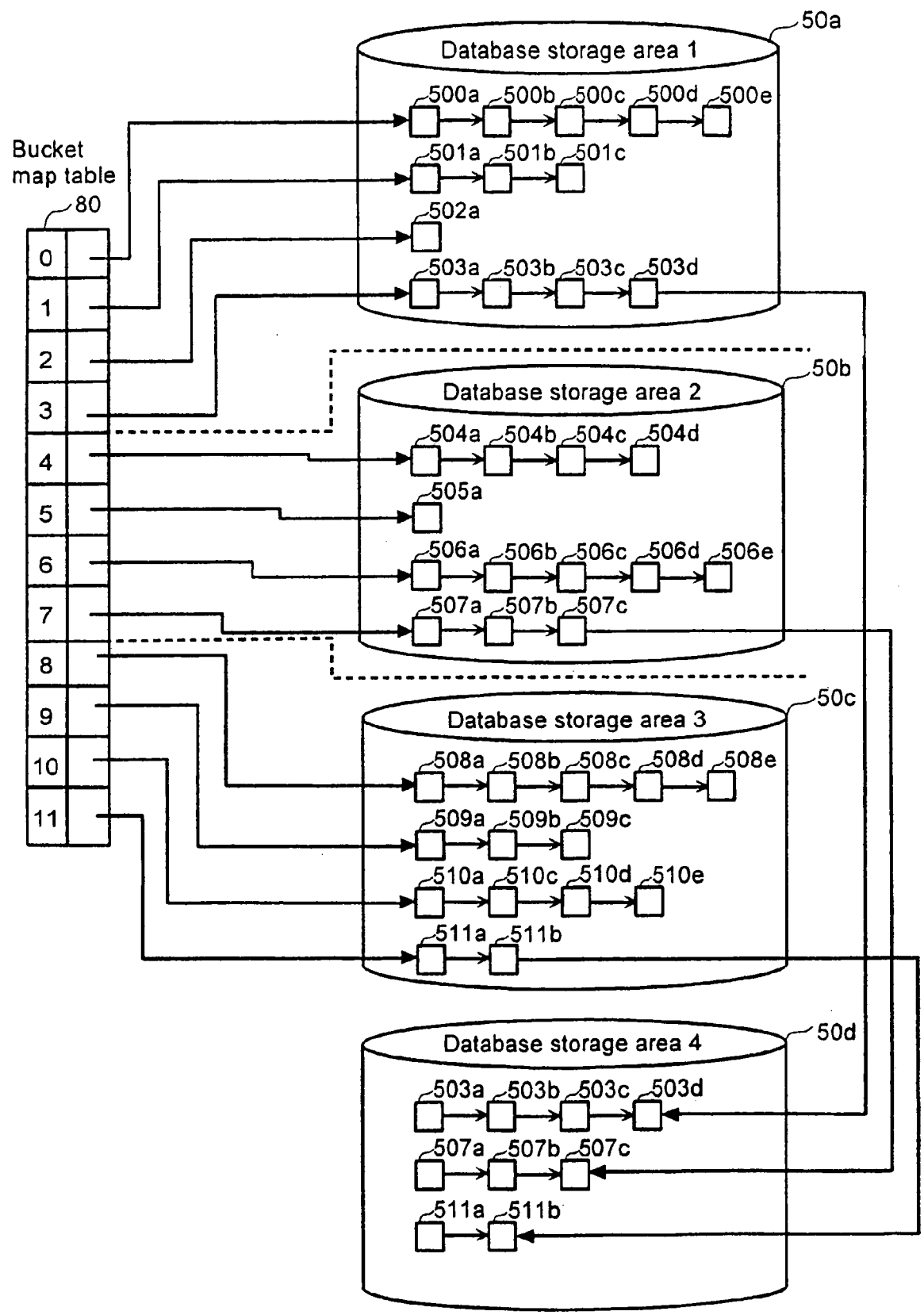
FIG. 5 shows data flows in data rearrangement which characterizes this invention.
Figure 6:
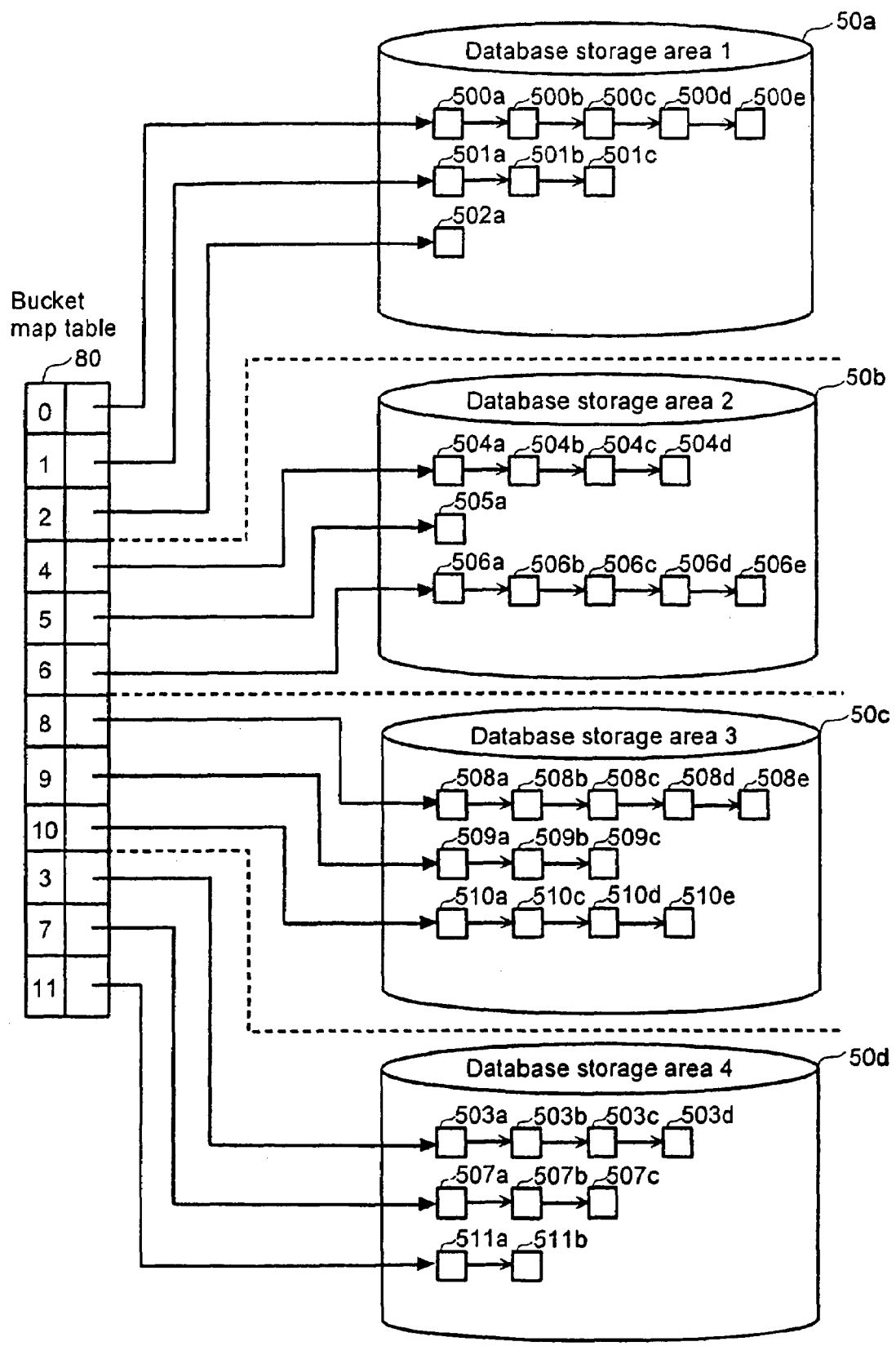
FIG. 6 shows the status of storages in database partitions after data rearrangement in FIG. 5.

Referring to FIGS. 5 and 6 the logic of data rearrangement based on the method for partitioning and storing a database according to this invention is explained next. FIG. 5 shows how data flows when database storage area 50d is newly added to the three database storage areas shown in FIG. 1. When one database storage area is added, because the bucket map table 80 is divided into 12 buckets, one fourth of the buckets in each existing database storage area is chosen and moved to the new database storage area 4 (50d) so that each of the database storage areas has an equal number of buckets. From database storage area 1 (50a), bucket 3 is chosen from among buckets 0 to 3. Referring to the segment chain for the bucket 3 from the bucket map table 80, segments 503a, 503b, 503c and 503d are entered and moved to database storage area 4 (50d). From database storage area 2 (50b), bucket 7 is chosen from among buckets 4 to 7. Referring to the segment chain for the bucket 7 from the bucket map table 80, segments 507a, 507b and 507c are entered and moved to database storage area 4 (50d). From database storage area 3 (50c), bucket 11 is chosen from among buckets 8 to 11. Referring to the segment chain for the bucket 11 from the bucket map table 80, segments 511a and 511b are entered and moved to database storage area 4 (50d). When the bucket rearrangement has been thus finished, the database is rearranged as shown in FIG. 6. Although the order of bucket entry numbers in the bucket map table 80 is changed for the purpose of better illustration here, it is preferable for the bucket entry numbers to be arranged in ascending order. Once database storage area 4 (50d) has been added and the database rearrangement is complete, buckets 0, 1 and 2 are allocated to database storage area 1 (50a), buckets 4, 5 and 6 to database storage area 2 (50b), buckets 8, 9 and 10 to database storage area 3 (50c), and buckets 3, 7 and 11 to database storage area 4 (50d).

Figure 7:
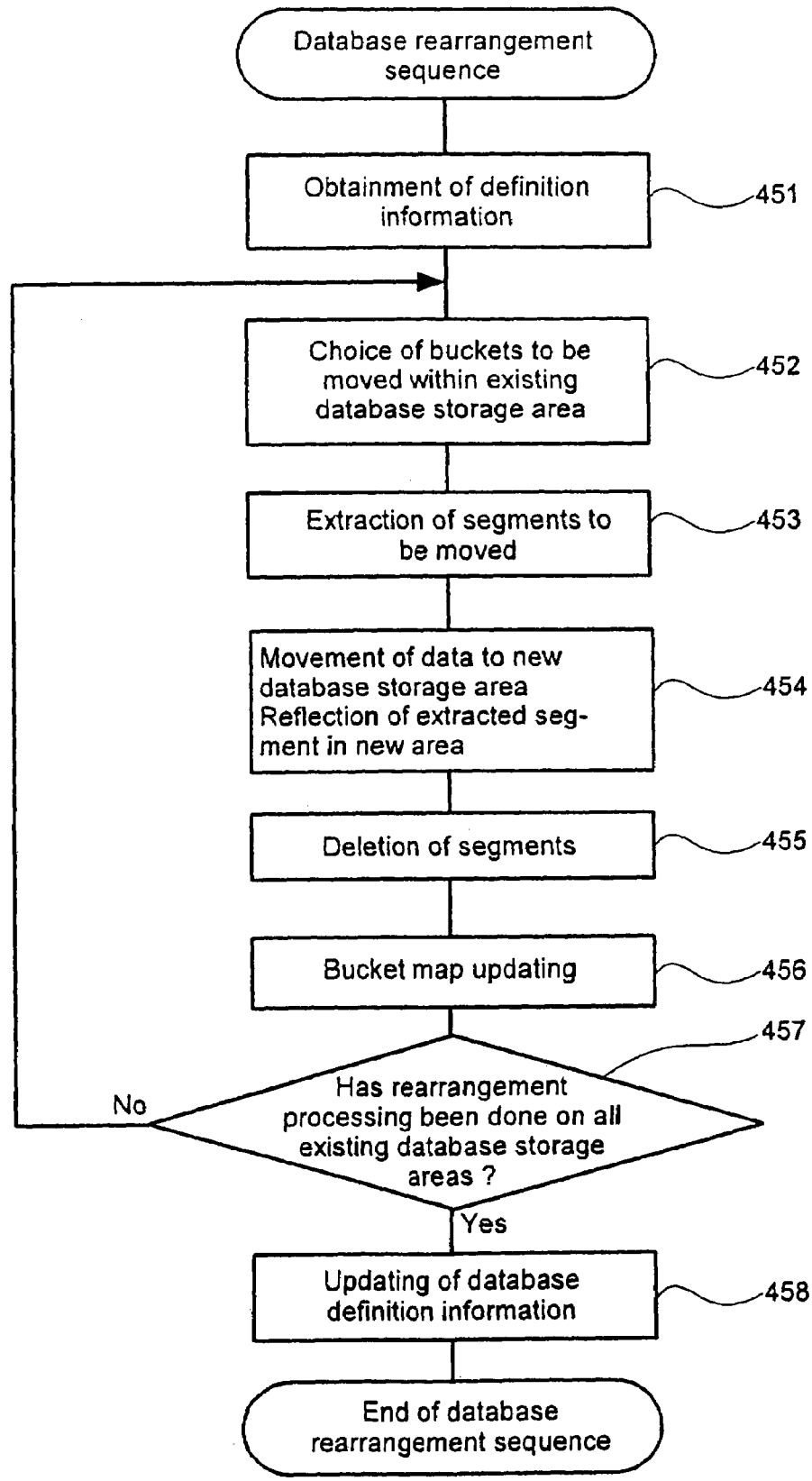
FIG. 7 shows a general flow of the sequence of database rearrangement according to this invention.

According to the logic of data rearrangement illustrated in FIGS. 5 and 6, the data rearrangement processing sequence is shown in FIG. 7. As a data rearrangement request is inputted from a terminal 30 as shown in FIG. 2, the database access controller 400 in the database management system 40 receives it. The database access controller 400 analyzes the received request and when it recognizes the request as a data rearrangement request, it transfers the control over the request to the data rearrangement processor 450. In the data rearrangement processor 450, the definition information on the table is obtained from the database definition information storage area 60 (step 451). From the obtained definition information, information on all existing database storage areas is picked up. For each of the existing database storage areas on which the information has been picked up, which bucket should be moved is decided referring to the bucket map table 80 (step 452). In the case of FIG. 5, there are three existing database storage areas and the bucket map table has a maximum of 12 buckets, so if one new database storage area is to be added, the number of buckets in each database storage area should be one fourth of the maximum number of buckets. The buckets to be moved from the respective database storage areas are chosen in this way. Then, referring to the information on chained segments in the bucket map table 80, the segments to be moved are extracted (step 453). In this extraction process, whether segments are moved on a page-by-page basis or on a segment-by-segment basis should be decided depending on the available memory size. Then, the segments thus extracted are reflected in the new database storage area (step 454) In this reflection process, new segments are created in the new database storage area in order to store the extracted segments for writing there. Upon completion of the reflection process for the extracted segments, the segments concerned in the existing database storage areas are deleted (step 455). Then, the information on segment chains in the bucket map table 80 is updated accordingly and the information on data allocation to the database storage areas is also updated (step 456).

The above procedure from step 452 to step 456 must be taken for all the existing database storage areas from which segments are moved to the new area, before rearrangement processing of all the existing database storage areas is finished (step 457). As data rearrangement is ended with completion of both the data extraction and reflection processes, the information on the new database storage area is reflected in the database definition information to complete the entire rearrangement sequence (step 458).

In the above database rearrangement process, there is no need to read data on a record-by-record basis from each existing database storage area; instead, the data is read on a segment-by-segment basis and written into the newly added database storage area. Also there is no need to read any buckets other than the ones to be moved.

Figure 8:
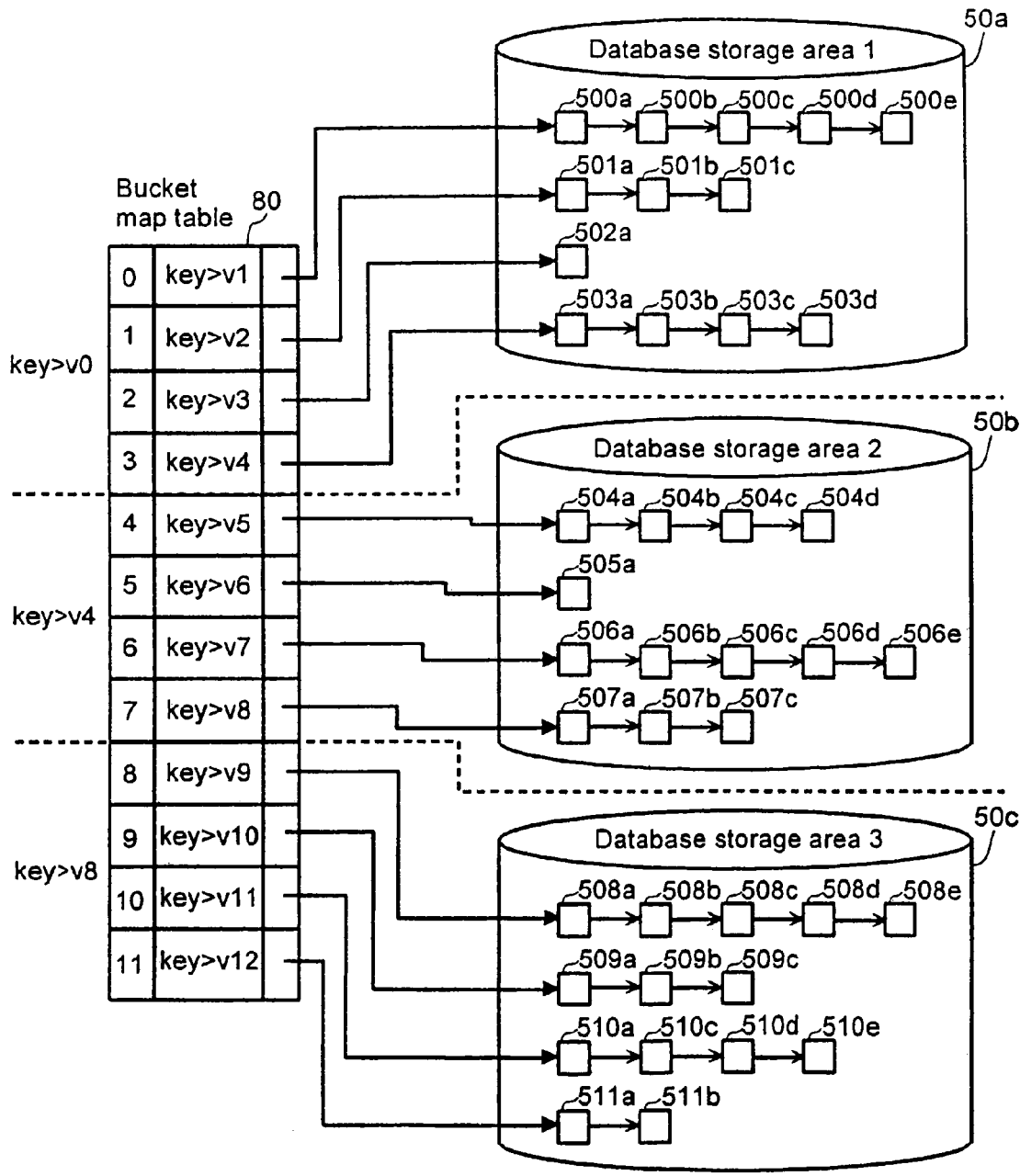
FIG. 8 shows the logic of partitioned storage of a key-range partitioned database.

FIG. 8 shows the logic of management of a key-range partitioned database according to this invention.

As an example, text for defining a "ZAIKO" table in the database is shown below.

```
CREATE TABLE ZAIKO (
SCOPE    CHAR(10),
SNAME    CHAR(10),
COL      CHAR(4),
TANKA    INTEGER,
ZSURYO   INTEGER)
IN((DBAREA1) SCODE>v0, (DBAREA2) SCODE>v4,
    (DBAREA3) SCODE>v8;
```

According to the above definition, the "ZAIKO" table is composed of four columns, SCODE, SNAME, COL, TANKA, and ZSURYO, each column being given a data type. With the SCOPE column as a partitioning key, the data is key-range partitioned and the partitioned data is stored separately into three database storage areas DBAREA1, DBAREA2, and DBAREA3. Taking the "ZAIKO" table as an example, the logic of table partitioning is explained next referring to FIG. 8. In FIG. 8, for the data in the SCODE column as a partitioning key, an appropriate database storage area is defined based on the key range partition definition and the defined database storage area is divided into four buckets. Each bucket corresponds to a subdivision of one key range. Division into buckets is made by simply dividing key ranges or by obtaining access to distribution of actual included data and then dividing data into partitions or key ranges for equal data volume allocation.

If three database storage areas are available, initialization is made so that four buckets are equally allotted to each database storage area. Also, with each entry in the bucket map table 80, pointers are stored for segments in the correlated database storage area. A segment is composed of a plurality of fixed-length pages. Records with the value in the SCODE column above v0 and not larger than v4 are allocated to database storage area 1. For bucket entry No. 0, records with the value in the SCODE column above v0 and not larger than v1 are allocated and the pointer for segment 500*a* is stored, suggesting that segments 500*a*, 500*b*, 500*c*, 500*d* and 500*e* are chained. For bucket entry No. 2, records with the value in the SCODES column above v1 and not larger than v2 are allocated and the pointer for segment 501*a* is stored, suggesting that segments 501*a*, 501*b* and 501*c* are chained. For bucket entry No. 2, records with the value in the SCODE column above v2 and not larger than v3 are allocated and the pointer for segment 502*a* is stored. For bucket entry No. 3, records with the value in the SCODES column above v3 and not larger than v4 are allocated and the pointer for segment 503*a* is stored, suggesting that segments 503*a*, 503*b*, 503*c* and 503*d* are chained. Likewise, database storage area DBAREA2 stores buckets with bucket entry numbers 4 to 7, and database storage area DBAREA3 stores buckets with bucket entry numbers 8 to 11.

Figure 9:
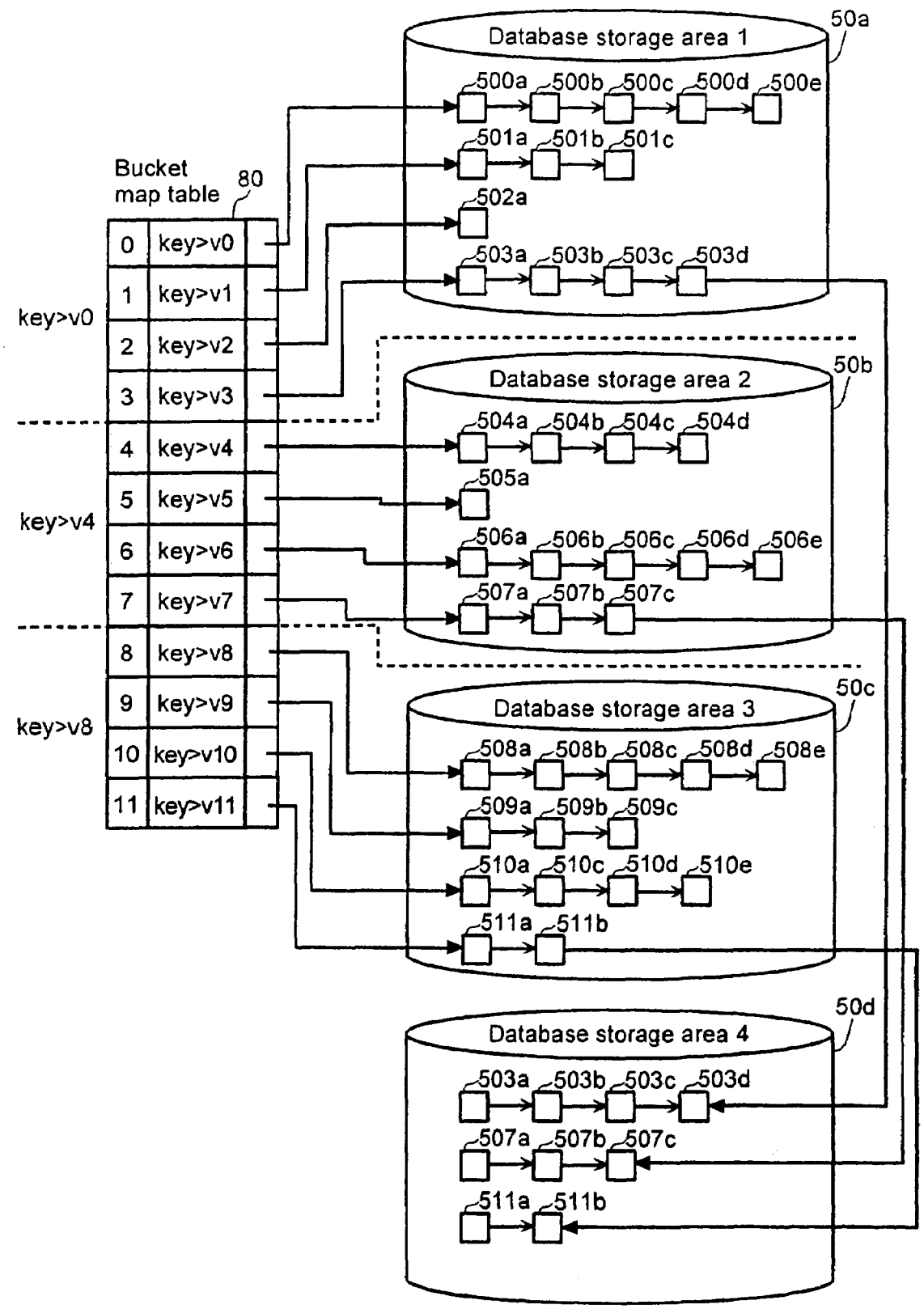
FIG. 9 shows data flows in data rearrangement of a key-range partitioned table which characterizes this invention.
Figure 10:
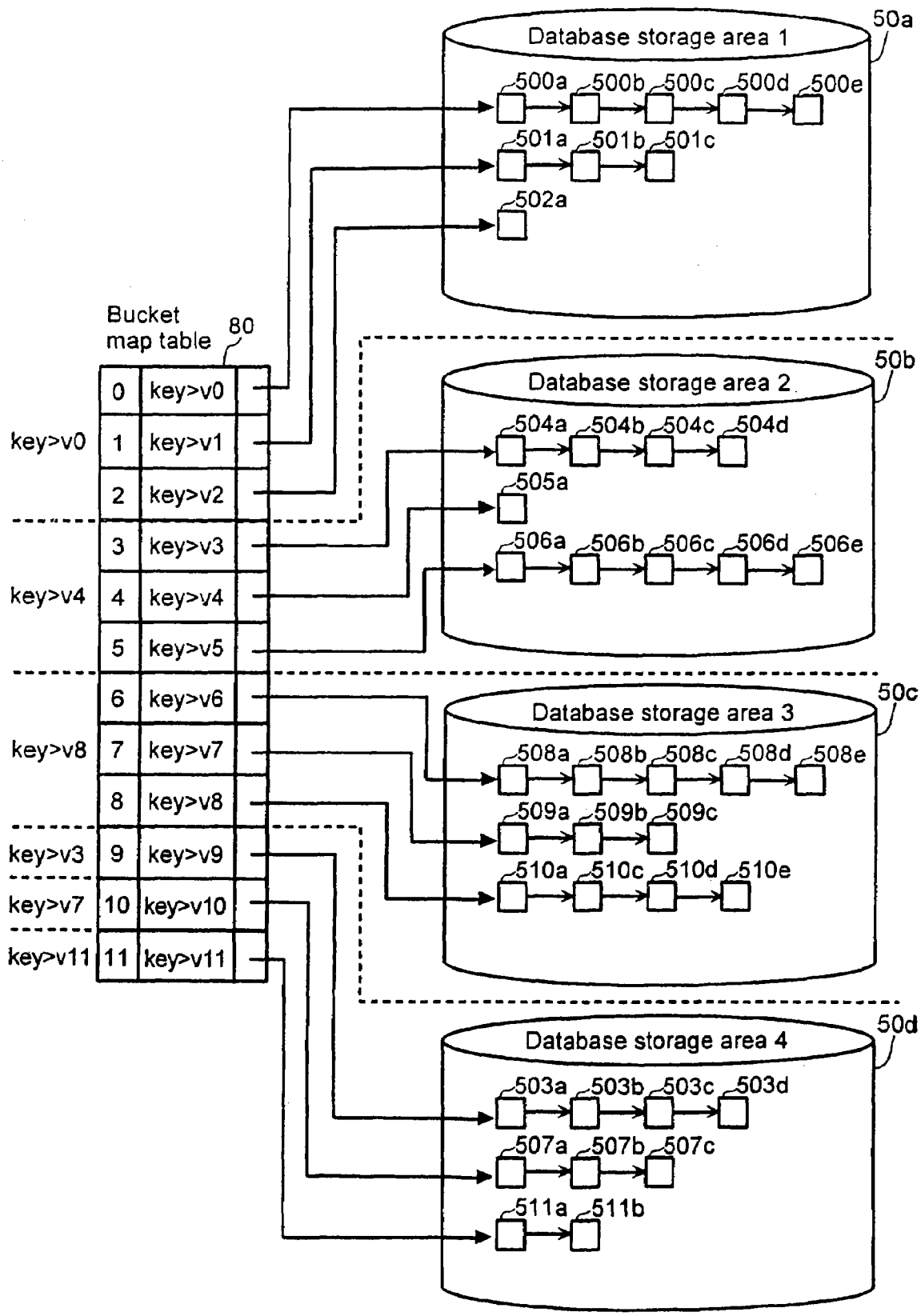
FIG. 10 shows the status of partitioned storages of a key-range partitioned database after data rearrangement in FIG. 5.

The logic of data rearrangement of the key-range partitioned database based on the method for partitioning and storing a database according to this invention is explained next referring to FIGS. 9 and 10. FIG. 9 shows how data flows when database storage area 4 (50*d*) is newly added to the three database storage areas shown in FIG. 8. When one database storage area is added, because the bucket map table 80 is divided into 12 buckets, one fourth of the buckets in each existing area is chosen and moved to the new database storage area 4 (50*d*) so that each database storage area has an equal number of buckets. From database storage area 1 (50*a*), bucket 3 is chosen from among buckets 0 to 3. Referring to the information on the segment chain for the bucket 3 in the bucket map table 80, segments 503*a*, 503*b*, 503*c* and 503*d* are entered and moved to database storage area 4 (50*d*). From database storage area 2 (50*b*), bucket 7 is chosen from among buckets 4 to 7. Referring to the information on the segment chain for the bucket 7 in the bucket map table 80, segments 507*a*, 507*b* and 507*c* are entered and moved to database storage area 4 (50*d*). From database storage area 3 (50*c*), bucket 11 is chosen from among buckets 8 to 11. Referring to the information on the segment chain for the bucket 11 in the bucket map table 80, segments 511*a* and 511*b* are entered and moved to database storage area 4 (50*d*). When the bucket rearrangement has been thus finished, the database is partitioned and rearranged as shown in FIG. 10. Although the order of bucket entry numbers in the bucket map table 80 has been changed for the purpose of better illustration here, it is preferable for the bucket entry numbers to be arranged in ascending order. Once database storage area 4 (50*d*) has been added and the database rearrangement is complete, buckets 0, 1 and 2 are allocated to database storage area 1 (50*a*), buckets 4, 5 and 6 to database storage area 2 (50*b*), buckets 8, 9 and 10 to database storage area 3 (50*c*), and buckets 3, 7 and 11 to database storage area 4 (50*d*). In the case of the key-range partitioned database shown in this embodiment, the database definition must be updated after the rearrangement.

In this embodiment, the database which has been initially defined as being partitioned into three key ranges is redefined as being partitioned into six key ranges after the rearrangement or moving data from the key ranges.

As explained above, the data in the database is partitioned into a plurality of pre-fixed buckets and the buckets are stored in physically independent segments within database storage areas so that at the time of data rearrangement necessitated by the addition of a new database storage area, only the data in the buckets to be moved needs to be rearranged.

In addition, the segments from which data has been taken for rearrangement become free so they can be reused as storage segments for other buckets, thereby leading to efficient use of free database storage space.

According to this invention, therefore, it is possible to optimally store data in a plurality of database storage areas.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for managing data by a database management apparatus including a computer and at least one storage device having a data storage area, comprising:
   providing first information correlating a first bucket and a data storage area,
   wherein a number of the first bucket is a number of the data storage area as defined by database definition information;
   providing second information correlating a second bucket and one or more data in the data storage area,
   wherein a number of the second bucket is a segment number of a segment in the data storage area, said segment storing the one or more data;
   managing the data storage area correlated with the first bucket in accordance with the first information;
   managing the one or more data of said segment correlated with the second bucket in accordance with the second information; and
   managing the first bucket being correlated with the second bucket by a bucket map table.

2. The method of claim 1, wherein the segment number is a number of the one or more data in the data storage area so that a quantity or number of one or more data is equal.

3. The method of claim 1, further comprising:
   changing the bucket map table including the second bucket of the second information correlated to the first bucket of the first information;
   selecting data corresponding to the first bucket of the changed bucket map table in accordance with the second information;
   selecting the data storage area corresponding to the second bucket of the first information from the first information; and
   moving the selected data to the selected data storage area.

4. The method of claim 1, further comprising:
   in response to a data insertion request, obtaining database definition information;
   identifying a data storage area that is available for data insertion in accordance with the obtained database definition information and the first information;
   identifying the second bucket from the bucket map table as set forth by the second information, and identifying a segment in the data storage area corresponding to the second bucket; and
   inserting data in the segment.

5. The method of claim 1, further comprising:
   in response to a data search request, obtaining database definition information;
   identifying a data storage area in accordance with the obtained database identifying the second bucket from the bucket map table as set forth by the second information, and identifying a segment in the data storage area corresponding to the second bucket; and
   searching for data which matches search conditions in the segment.

6. A computer system, comprising:
   a database management system for managing a data;
   a first storage having a plurality of data storage areas; and
   a second storage having stored therein first information correlating a first bucket and a data storage area,
   wherein a number of the first bucket is a number of the data storage area as defined by database definition information and second information correlating a second bucket and one or more data in the data storage area,
   wherein a number of the second bucket is a segment number of a segment in the data storage area, said segment storing the one or more data,
   wherein said database management system manages the data storage area correlated with the first bucket in accordance with the first information, manages divided data of the one or more data correlated with the second bucket in accordance with the second information, and manages the first bucket being correlated with the second bucket by a bucket map table.

7. The computer system of claim 6, wherein the segment number is a number of the one or more data in the data storage area so that a quantity or number of one or more data is equal.

8. The computer system of claim 6, wherein said database management system changes the bucket map table including the second bucket of the second information correlated to the first bucket of the first information, selects data corresponding to the first bucket of the changed bucket map table in accordance with the second information, selects the data storage area corresponding to the second bucket of the first information from the first information, and moves the selected data to the selected data storage area.

9. The computer system of claim 6, wherein said database management system in response to a data insertion request, obtains database definition information, identifies a data storage area that is available for data insertion in accordance with the obtained database definition information and the first information, identifies the second bucket from the bucket map table as set forth by the second information, and identifying a segment in the data storage area corresponding to the second bucket, and inserts data in the segment.

10. The computer system of claim 6, wherein said database management system in response to a data search request, obtains database definition information, identifies a data storage area in accordance with the obtained database identifying the second bucket from the bucket map table as set forth by the second information, and identifying a segment in the data storage area corresponding to the second bucket, and searches for data which matches search conditions in the segment.

* * * * *